R. L. ZILLER.
POROUS PIPE AND METHOD OF MANUFACTURING THE SAME.
APPLICATION FILED SEPT. 29, 1909.
968,226. Patented Aug. 23, 1910.
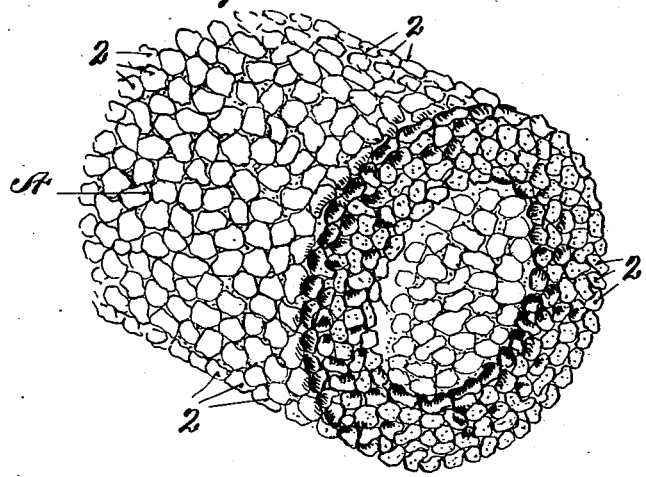
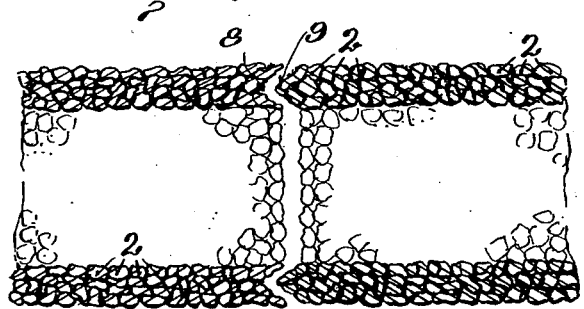
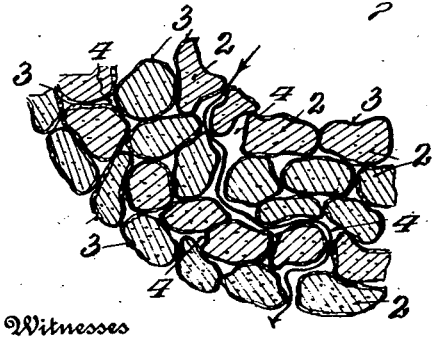
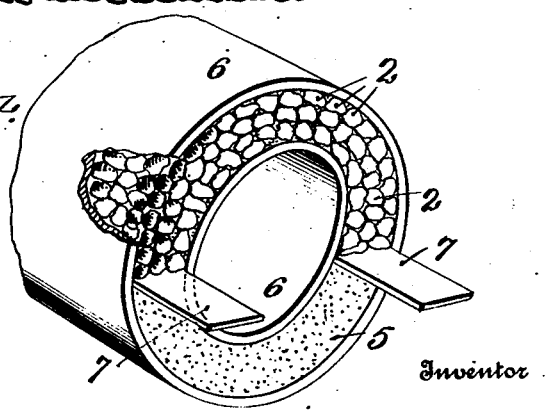

UNITED STATES PATENT OFFICE.

ROBERT L. ZILLER, OF AUSTIN, TEXAS.

POROUS PIPE AND METHOD OF MANUFACTURING THE SAME.

968,226.  Specification of Letters Patent.  Patented Aug. 23, 1910.

Application filed September 29, 1909. Serial No. 520,150.

*To all whom it may concern:*

Be it known that I, ROBERT L. ZILLER, a citizen of the United States, residing at Austin, in the county of Travis and State of Texas, have invented certain new and useful Improvements in Porous Pipe and Methods of Manufacturing the Same, of which the following is a specification.

My invention relates to porous pipe which may be used for sub-irrigation or for other purposes to which it is applicable, and one object of the invention is to provide a pipe of relatively great porosity, in which the interstices or perforations through the pipe cannot be readily closed by reason of the infiltration of sand or mud or the projection of small rootlets into the interstices or perforations.

A further object is to provide a porous pipe in which the interstices form relatively long and tortuous channels for the passage of water, thus further preventing any filling up of the passages by mud or sand getting into the interior of the pipe, or the insertion of roots.

A further object is to provide a very simple process by which pipe, either entirely or partially porous, may be made.

The invention consists in molding pipe of a mass of solid particles or granules of gravel, crushed stone, or the like, which solid particles or granules contact with each other at separated points upon their surface, or discontinuously, the particles being held to each other and into a solid mass only at these points of natural contact. This result is secured by coating the individual grains or particles in a mass of such particles, with cement or like adhesive material, and then placing the contents relatively loosely in a suitable mold, whereby the particles cannot be forced into continuous and close contact with each other, and whereby the cement or other binder used shall not fill up the interstices between the particles, thus leaving these interstices unfilled and forming a mass permeated by tortuous channels through which the water may pass from the interior of the pipe to the exterior thereof.

A pipe made in accordance with my invention is shown in the accompanying drawings, in which:

Figure 1 is a perspective view of a section of pipe constructed in accordance with my invention; Fig. 2 is a longitudinal section thereof; Fig. 3 is an enlarged detail section through the wall of the pipe; and, Fig. 4 is a perspective view of the end of a mold showing a partly porous drain pipe and the means for making the same.

Corresponding and like parts are referred to in the following description and indicated in all the views of the drawings by the same reference characters.

Referring to these drawings, 2 designates the individual pebbles which are bound or cemented to each other at their points of contact by the coating of cement 3. It will be seen that these pebbles are irregular in shape, and as a consequence, they cannot have continuous contact with each other, and that therefore a large number of irregular openings and passages 4 are left around the pebbles or granules, which passages communicate with each other and ramify throughout the entire mass, so that the wall of the pipe A is porous throughout its entire extent, and the passages connect with each other and do not extend continuously from the inside face of the pipe to the exterior thereof, so that even though one passage 4 between one granule and another is closed, yet by reason of the passages opening into each other, there will still be entirely free outlet for the water seeping through the walls of the pipe.

In general, the process of making my improved porous pipe is as follows: Gravel, crushed stone, shells, or other irregular and hard particles are mixed with a sufficient portion of relatively thin cement, the amount and consistency of the cement to be determined by the size of the particles to be used. The particles are coated, as above described, with cement, and are placed in molds so as to form a pipe somewhat after the shape of an ordinary sewer pipe. The mass of irregular coated particles may be rammed into the mold without chance of forcing the particles into too close contact with each other, for the reason that the particles, being irregular and being merely coated with cement, cannot possibly be forced into such close contact that the interstices between the particles will be filled up. After the mass has set, it is removed from the mold and cured as other cement mixtures are cured until it is thoroughly hard and ready for use. This process provides pipe which is filled with small and irregular interstices and through which the water percolates through the soil, and which gives gradual and uniform distribution of the water, such as is necessary for sub-soil irrigation. It will be seen that no sand or other fine material is used, which will fill up the interstices between the relatively large particles, and that only enough cement is used to combine the particles into a hard mass that will be very porous and through which water will easily pass in all directions. It will be seen that the water does not pass straight through the pipe, as it would do if the wall of the pipe were simply perforated. This is particularly desirable, because it prevents the pipe from becoming clogged. The pipe cannot clog, because the holes are, in the first place, not of even size, and the passages formed between the particles of gravel or stone have a constantly changing shape from the inner face of the pipe to the outer. Thus it can never become clogged by roots or dirt, and the water must pursue an irregular course through a sinuous or zig-zag channel. It will be seen also that the channel for the water is far longer than it would be if the channel extended directly from the inside to the outside of the pipe without all the deviations and meanderings consequent upon the irregular shape and course of the interstices between the stones.

It is sometimes desirable to form a pipe which shall be solid at one portion of its wall and porous as to the remainder of the wall. In Fig. 4 I show a pipe having a porous upper portion and a solid lower portion, which is used for draining. For irrigating, this half-solid porous pipe is turned over, and the solid part is uppermost. This is particularly necessary where the soil is full of silt which might possibly work into the pipe. In order to manufacture this pipe, a mold such as 6 is used, and a narrow strip 7 of sheet iron the width of the edge of the pipe is inserted at what is to be the junction between the porous and nonporous portions of the pipe. One half of the mold is then filled with small stones or gravel, as above explained, with just enough cement to unite them at the point of contact, and the other half of the mold is filled with a mixture 5 composed of sand and cement closely packed and nonporous. The material is placed in the mold in a softened condition, and when the mold is filled, the two strips are pulled out, and the result is that the soft cement on both sides works into the interstices of the porous edge and forms a solid union between the two sections.

While I may form my pipe in any desired manner, I show in Fig. 2 a pipe having one end formed with an angular V-shaped recess 8, and the other end having a V-shaped edge which will fit in the recess. In use, the recess 8 is filled with soft cement, and the V-shaped end 9 of the adjacent pipe is forced into the recess. Thus, the two lengths of pipe are solidly joined together.

I do not wish to limit myself to any particular form or character of mold whereby the pipe may be manufactured, nor to any particular form of pipe, the invention consisting in the method of molding the pipe, and not in any particular mold, and in a pipe of the general character described.

My invention is very effective in practice, provides a pipe which is uniformly porous along its entire extent, which may be very cheaply made, and which is not liable to clog by reason of the infiltration of sand, mud, or the projection of roots or other vegetable matter into the perforations of the pipe.

My invention provides a pipe which is peculiarly adapted for sub-irrigation and for sub-soil drainage, in that it permits of a uniform supply of water to the ground through which the pipe passes, or a uniform drainage therefrom. Further than this, it will be seen that my pipe may be constructed at any place where gravel and cement can be secured, and that it is not necessary to provide a manufacturing plant in order to make it. The size of the crushed stone and gravel to be used, as before remarked, is determined by the quantity of water which it is desired should escape from the pipe, and the nature of the soil. This selection of proper sized gravel may be easily secured by the use of sieves or screens, such screens permitting the sand and the smaller particles to escape, but retaining all particles of a certain definite size and character.

I intend to use these pipes by either laying them in a system beneath a field, or using them to surround isolated trees, and providing them with means whereby they may be filled with water at intervals.

Having thus described the invention, what I claim is:—

1. As an article of manufacture, a porous pipe, the wall of which is composed of irregular particles touching each other at separated points and adhering to each other at their points of contact, and thereby providing interstices ramifying through said wall and permitting the passage of water from the interior of the pipe to the exterior thereof.

2. As an article of manufacture, a porous pipe, the wall of which is composed of a mass of solid particles touching each other only at separated points, and cementitious material disposed between said contacting points, and causing said particles to adhere to each other at such points, thereby providing interstices ramifying in all directions from the interior to the exterior of the pipe.

3. As an article of manufacture, a porous pipe, the wall of which is composed of irregular particles, each particle being coated with cement, the particles touching each other at separated points and adhering to each other at their points of contact thereby providing interstices ramifying through the wall from the interior to the exterior thereof and permitting the passage of water from the interior of the pipe to the exterior thereof.

In testimony whereof I affix my signature in presence of two witnesses.

ROBERT L. ZILLER. [L. S.]

Witnesses:
WILLIAM H. CULLEN,
JAMES F. JOHNSON.